(12) United States Patent
Welch et al.

(10) Patent No.: US 8,814,245 B1
(45) Date of Patent: Aug. 26, 2014

(54) MULTI-TIERED REAR CARGO AREA STORAGE SYSTEM

(71) Applicant: Ford Global Technolgies, LLC, Dearborn, MI (US)

(72) Inventors: Ryan Welch, Ottawa Lake, MI (US); Annette Lynn Huebner, White Lake, MI (US); Artur Sakarian, Birmingham, MI (US); Kristin Ann Hellman, Walled Lake, MI (US); Josh Greiner, Detroit, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 0 days.

(21) Appl. No.: 14/102,781

(22) Filed: Dec. 11, 2013

(51) Int. Cl.
*B60R 7/04* (2006.01)

(52) U.S. Cl.
USPC ............................................. 296/37.16

(58) Field of Classification Search
CPC .................................. B60R 7/04; B60R 7/043
USPC ............... 296/24.3, 24.33, 24.4, 24.44, 37.1, 296/37.5, 37.8, 37.14, 37.15, 37.16, 63; 224/275; 297/188.04
See application file for complete search history.

(56) References Cited

U.S. PATENT DOCUMENTS

| | | | |
|---|---|---|---|
| 2,619,395 A * | 11/1952 | Kent ............................. | 108/38 |
| 2,881,039 A * | 4/1959 | Guzman ....................... | 297/163 |
| 3,049,374 A * | 8/1962 | Nance ........................... | 297/146 |
| 3,795,422 A * | 3/1974 | Robinson et al. ............. | 297/146 |
| 5,037,154 A * | 8/1991 | Senba et al. ................ | 296/37.16 |
| 5,039,155 A * | 8/1991 | Suman et al. ............... | 296/65.03 |
| 5,669,537 A | 9/1997 | Saleem et al. | |
| 5,967,054 A | 10/1999 | Rosenfeld | |
| 6,050,202 A * | 4/2000 | Thompson ..................... | 108/44 |
| 6,113,172 A * | 9/2000 | Chaloult et al. ............ | 296/26.08 |
| 6,176,535 B1 * | 1/2001 | Chaloult et al. ........... | 296/37.16 |
| 6,290,277 B1 * | 9/2001 | Spykerman et al. ....... | 296/24.43 |
| 6,338,518 B1 | 1/2002 | D'Annunzio et al. | |
| 6,494,533 B1 * | 12/2002 | Bohler ..................... | 297/188.05 |
| 6,502,900 B1 * | 1/2003 | Johnston ................... | 297/188.06 |
| 6,607,241 B2 * | 8/2003 | Johnston ................... | 297/188.06 |
| 6,629,726 B2 * | 10/2003 | Johnston ................... | 297/188.06 |
| 6,733,060 B1 * | 5/2004 | Pavkov et al. ............. | 296/37.16 |
| 6,874,667 B2 * | 4/2005 | Dykstra et al. ............. | 224/498 |
| 8,534,737 B2 * | 9/2013 | Torres et al. .............. | 296/37.16 |
| 2003/0090120 A1 * | 5/2003 | Barber et al. ............... | 296/37.5 |
| 2006/0102671 A1 | 5/2006 | Fitzpatrick | |

FOREIGN PATENT DOCUMENTS

EP 0667260 B1 4/1997

\* cited by examiner

*Primary Examiner* — Hilary Gutman
(74) *Attorney, Agent, or Firm* — Vichit Chea; Price Heneveld LLP (57) ABSTRACT

A multi-tier vehicular storage system comprises a medial platform operable between lower and upper positions. A rear seat is configured to horizontally receive the medial platform in the upper position. A bottom bin is disposed below and behind the rear seat and at least partially covered by the medial platform in the lower position. An upper bin coupled with the rear seat and rotationally operable between stowed and accessible positions.

20 Claims, 7 Drawing Sheets

MULTI-TIERED REAR CARGO AREA STORAGE SYSTEM

FIELD OF THE INVENTION

The present invention generally relates to vehicle storage organizers, and more specifically, a multi-tiered storage system for the rear storage area of a vehicle.

BACKGROUND OF THE INVENTION

Various automobiles include rear storage areas that are undivided open spaces into which various articles can be positioned. Certain vehicles include hooks, individual compartments and other features that can be used to organize cargo that is placed within the rear cargo area of a vehicle. Many of these features have a single use and limited functionality, wherein the storage features are not adaptable to position cargo of varying orientations, sizes, or materials.

SUMMARY OF THE INVENTION

In at least one aspect, a multi-tier vehicular storage system comprises a medial platform operable between lower and upper positions. A rear seat is configured to horizontally receive the medial platform in the upper position. A bottom bin is disposed below and behind the rear seat and is at least partially covered by the medial platform in the lower position. An upper bin is coupled with the rear seat and is rotationally operable between stowed and accessible positions.

In at least another aspect, a vehicular rear-compartment storage system comprises an operable frame having a platform. A rear seat includes a retainer for horizontally receiving the platform when the frame is in an upper position. A bottom bin has an upper lip configured to receive the platform when the frame is in a lower position. An upper bin is attached to the rear seat and is rotatable between stowed and accessible positions.

In at least another aspect, a multi-tier vehicular storage system comprises a bottom bin and a medial platform having an operable frame attached to the bottom bin, wherein the medial platform at least partially encloses the bottom bin when the frame is in a lower position. A rear seat is configured to horizontally receive the medial platform when the frame is in the upper position. A stowable upper bin is operable between stowed and accessible positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
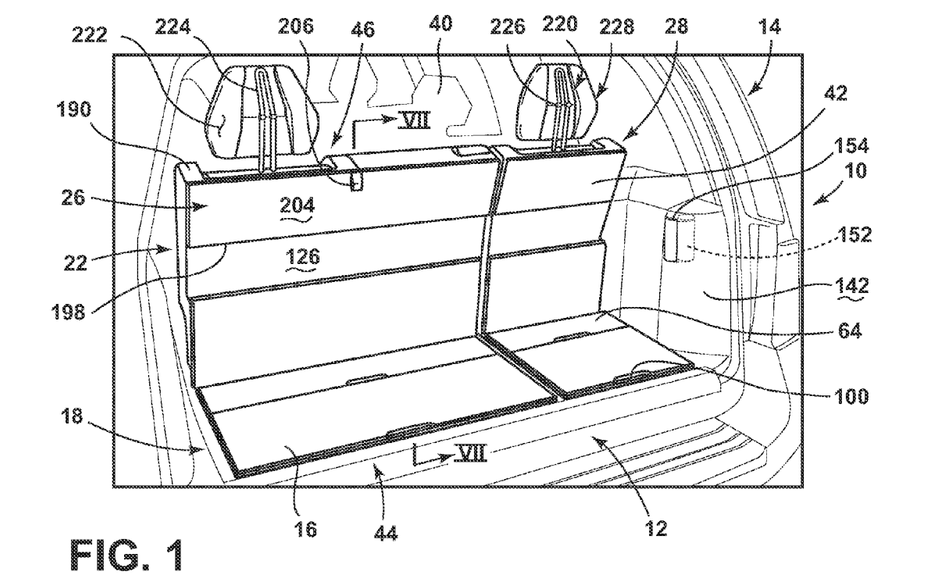
FIG. 1 is a rear top perspective view of a vehicle with an embodiment of the multi-tiered cargo storage system installed in a fully closed position and the medial platform disposed in a lower position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIG. 1, reference numeral 10 generally refers to a multi-tier vehicle storage system shown and installed within a rear cargo area 12 of a vehicle 14, according to one embodiment. The multi-tier storage system 10 includes a medial platform 16 operable between lower and upper positions 18, 20, and a rear seat 22 configured to horizontally receive the medial platform 16 in the upper position 20. A bottom bin 24 is disposed below and behind the rear seat 22 and is at least partially covered by the medial platform 16 when the medial platform 16 is in the lower position 18. An upper bin 26 is coupled with the rear seat 22 and is rotationally operable between a stowed position 28 and an accessible position 30.

Referring now to the embodiment illustrated in FIGS. 1-6, the multi-tier storage system 10 is typically disposed behind the rear-most seat in a vehicle 14 and within the rear cargo area 12 that is typically accessible by a rear hatch-type door or tailgate. Depending upon the type of vehicle 14 which incorporates the multi-tier storage system 10, the rear cargo area 12 may be behind the second row seat 40, or may be behind a third row seat 42 within the vehicle 14. It is contemplated that in vehicles 14 that have a stowable third row seat 42, separate multi-tier storage systems 10 may be disposed within the vehicle 14 behind each of the second row seat 40 and the third row seat 42. Additionally, the multi-tier storage system 10 may be divided into separate storage sections 44 to match seating arrangements where the rear seat 22 is separated into individually operable seating sections 46. Such seating sections 46 can include, but are not limited to, two seating sections 46 having a 40/60 seat arrangement, three seating sections 46 having a 40/20/40 seat arrangement, as well as other similar seat arrangements. Where the multi-tier storage system 10 is divided into separate storage sections 44, each storage section 44 can include a separate medial platform 16, a separate bottom bin 24 and a separate upper bin 26. Each of these separate components is independently operable, such that several storage configurations can be implemented, as will be discussed more fully below.

Figure 2:
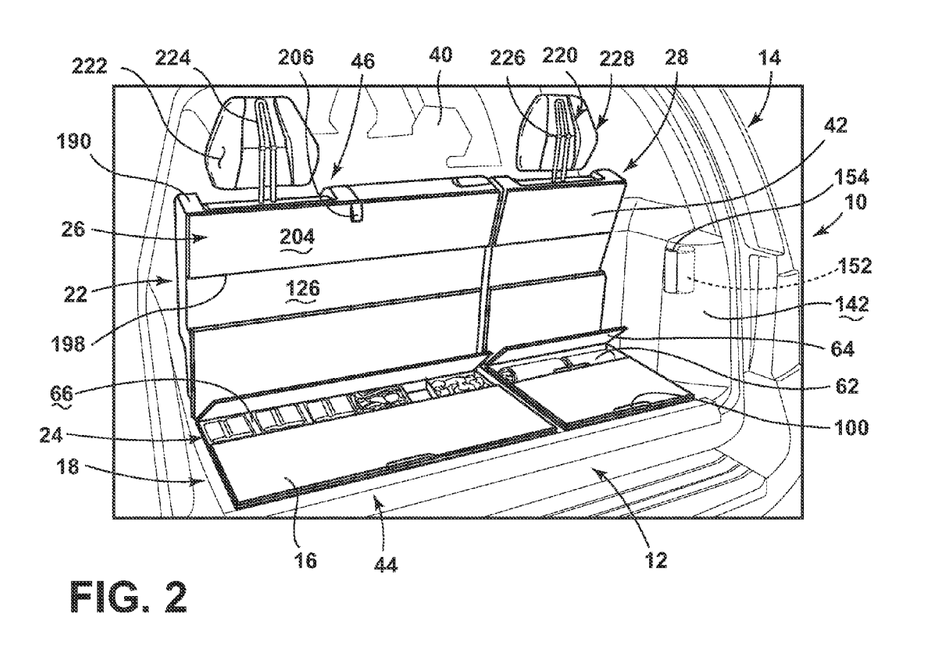
FIG. 2 is a rear top perspective view of the embodiment of FIG. 1 with the lids of the rear containers in an open position.
Figure 3:
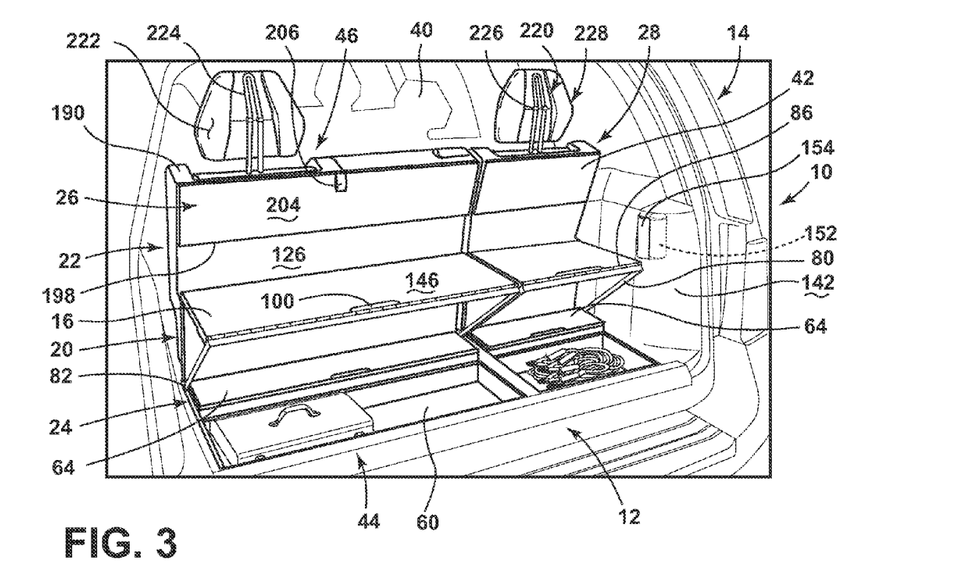
FIG. 3 is a rear top perspective view of the embodiment of FIG. 1 with the medial platforms disposed in an upper position.

Referring again to the embodiment illustrated in FIGS. 1 and 2, the bottom bin 24 of the multi-tier storage system 10 can be divided into front and rear containers 60, 62. The rear container 62 of the bottom bin 24 has a separate rear container lid 64, having a handle or other grasping feature, that is operable between open and closed positions to access a rear container interior 66 of the bottom bin 24. The front container 60 of the bottom bin 24 is configured to engage the medial platform 16 of the multi-tier storage system 10 in the lower position 18 such that the medial platform 16 acts as a lid for the front container 60. It is contemplated that the bottom bin 24 can include additional containers and compartments. These various containers and compartments can have separate lids. Alternatively, two or more compartments can share a single lid. It is also contemplated that the medial platform 16, in various embodiments, can act as a single lid for the entire bottom bin 24.

The embodiments shown in FIGS. 1-4 generally illustrate that the front and rear containers 60, 62 of the bottom bin 24 can vary in depth to provide storage space for items of various sizes and shapes. Typically, a compartment having a smaller lateral dimension will also include a smaller depth to provide storage for smaller items. Conversely, containers that have a larger opening will typically be deeper to account for storage space for larger items. It is contemplated that containers having a smaller opening can be deeper to account for long and slender items or a plurality of smaller items that are to be stored within the multi-tier storage system 10. Similarly, the containers having a larger opening can include a smaller dimensional depth for storage of substantially flat items. It is contemplated that each of the front and rear containers 60, 62 of the bottom bin 24 can have the same depth. In various embodiments, the dimensions of each of the front and rear containers 60, 62 of the bottom bin 24 can be dictated by the dimensional parameters of the vehicle 14, such as the placement of mechanical features on the underside of the vehicle 14 that may require protrusions within the undercarriage of the vehicle 14 to account for their placement. These protrusions can impact the dimensions of the containers of the bottom bin 24, in various embodiments.

Figure 7:
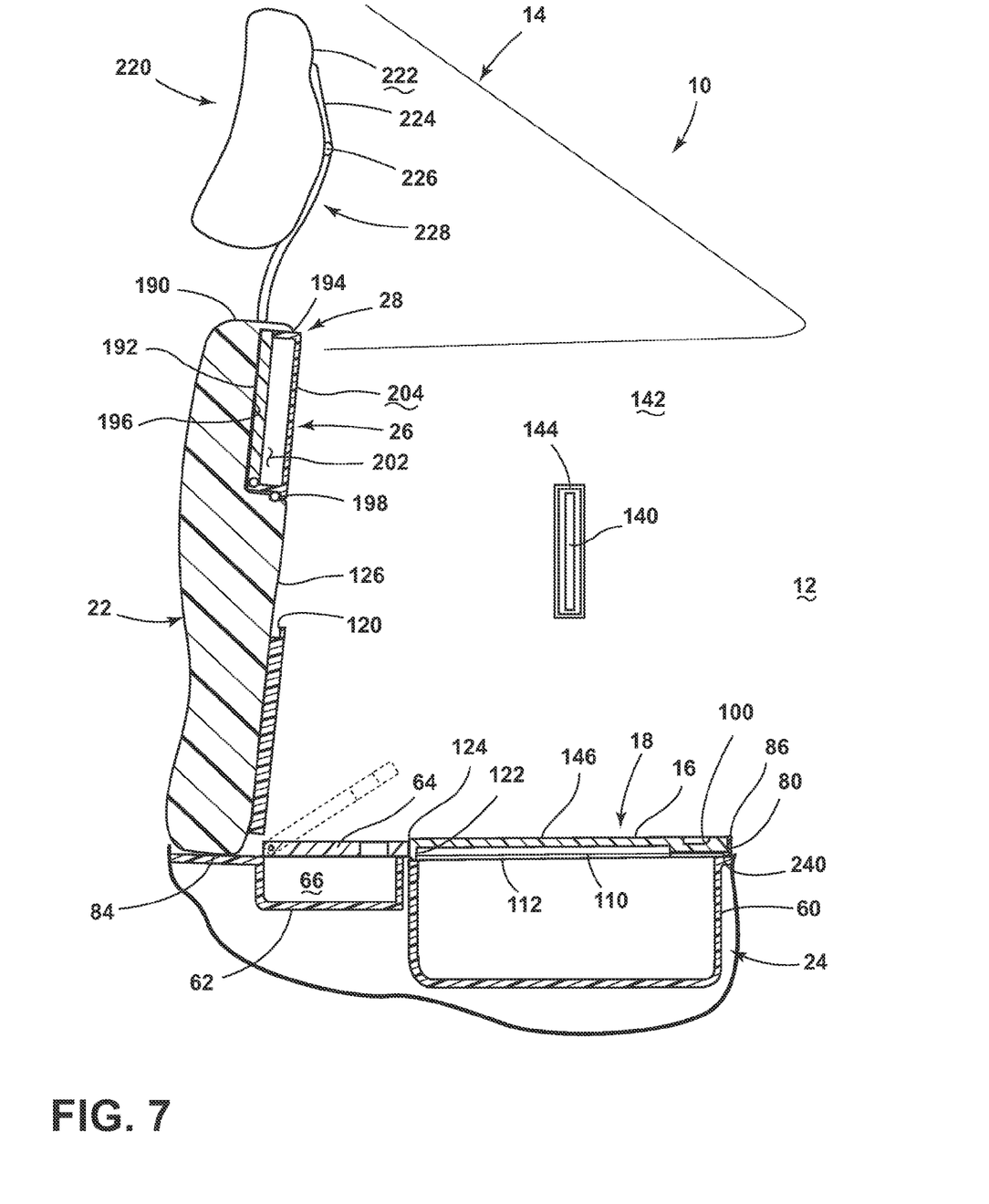
FIG. 7 is a cross-sectional view of the embodiment of FIG. 1 taken along line VII-VII.

Referring again to the embodiments shown in FIGS. 1-4, the medial platform 16 is connected to a medial platform frame 80 that is hingedly coupled to at least one edge of the medial platform 16. The medial platform frame 80 extends from the edge of the medial platform 16 to a frame hinge or a plurality of frame pivot points 82 that are disposed at the bottom bin 24 proximate a base 84 (shown in FIG. 7) of the rear seat 22. In this manner, the medial platform frame 80 is configured to rotate about the frame pivot points 82 of the bottom bin 24 to operate the medial platform 16 between the lower and upper positions 18, 20. A platform hinge 86 that connects the medial platform 16 and the medial platform frame 80 allows the medial platform 16 to remain substantially horizontal in both the lower and upper positions 18, 20. The medial platform frame 80 can also be rotated about the frame pivot points 82 in order to access the front container 60 of the bottom bin 24 by simply raising and lowering the medial platform frame 80 and not rotating the medial platform 16 within the medial platform frame 80. It is also contemplated that the front container 60 can be accessed by rotating the medial platform 16 about the platform hinge 86 to lift the medial platform 16 off from the front container 60 to access the interior of the front container 60.

As illustrated in the embodiments shown in FIGS. 3-6, the platform hinge 86 connects the medial platform 16 with a medial platform frame 80. In various embodiments, the platform hinge 86 is a piano hinge attached at a front edge 150 of the medial platform 16 and a front member 172 of the medial platform frame 80. In various embodiments, the platform hinge 86 can be one of many rotating-type connections that can include, but are not limited to, pivot points, a plurality of hinges, among others. In order to rotate the medial platform frame 80 and the medial platform 16 between the lower and upper positions 18, 20, the medial platform 16 includes a medial handle 100 for the user to grasp in order to operate the medial platform 16. It is contemplated that the medial handle 100 can include a member attached to the medial platform 16, or can include an aperture 144 within the medial platform 16 that will allow the user to grasp and operate the medial platform 16 between the lower and upper positions 18, 20 and also to operate the medial platform frame 80 without moving the medial platform 16 in order to access the front container 60 of the bottom bin 24. It is contemplated that similar handles and grasping features, as discussed above, can be used for each of the lids of the multi-tier storage system 10, including, but not limited to, lids for the rear container 62, the upper bin 26, and others.

As shown in the embodiments of FIGS. 6-9, the medial platform frame 80 can include a frame lip 110 proximate the bottom edge 112 of the medial platform frame 80 that is configured to support the medial platform 16 within the medial platform frame 80, while also providing a structural support for the medial platform 16 when disposed in the lower position 18. In this manner, substantially large and bulky items can be placed upon the medial platform 16 in the lower position 18. The frame lip 110 of the medial platform frame 80 is configured to provide sufficient structural support to the medial platform 16 to support such items.

As illustrated in the embodiments of FIGS. 3-9, the rear seat 22 proximate the multi-tier storage system 10 includes a latch 120 that is configured to engage a medial platform tab 122 disposed at the back edge 124 of the medial platform 16, wherein the medial platform tab 122 is configured to engage the latch 120 of the rear seat 22 to dispose the medial platform 16 in a horizontal configuration when placed in the upper position 20. The latch 120 of the rear seat 22 can include a single latch member 120, or can include a plurality of individual latch members 120 that are configured to engage the medial platform tab 122 in a plurality of locations along the medial platform tab 122. In this manner, the latch 120 of the rear seat 22 can include one or more hooks disposed on the rear surface 126 of the rear seat 22 placed at a predetermined height in order to receive the medial platform tabs 122 to dispose the medial platform 16 substantially horizontal when in the upper position 20.

In various embodiments, it is contemplated that the latch 120 of the rear seat 22 and the medial platform tab 122 can define a mating engagement such that the medial platform 16 is securely placed within the latch 120 to substantially prevent unintentional movement of the medial platform 16 out of the upper position 20 when the vehicle 14 is in operation. Additionally, the latch 120, the medial platform tab 122, or both, can include interference members that are configured to create an interference connection between the latch 120 and the medial platform tab 122 to substantially secure the medial platform 16 in the upper position 20 during use of the vehicle 14 and to substantially prevent the medial platform 16 from being unintentionally dislodged from the upper position 20.

Referring again to the embodiments of FIGS. 4-9, in order to place the medial platform 16 in the upper position 20, the user can lift the medial platform frame 80 using the medial handle 100 of the medial platform 16 to elevate the medial platform 16 above the front container 60 of the bottom bin 24. Using the medial handle 100, the user can rotate the medial platform 16 at the platform hinge 86 connecting the medial platform 16 and the medial platform frame 80 in order to extend the medial platform tab 122 proximate the latch 120 of the rear seat 22. The user can then place the medial platform tab 122 into engagement within the latch 120 to secure the medial platform 16 within the upper position 20 such that various items can be placed upon the medial platform 16 in the upper position 20.

Figure 4:
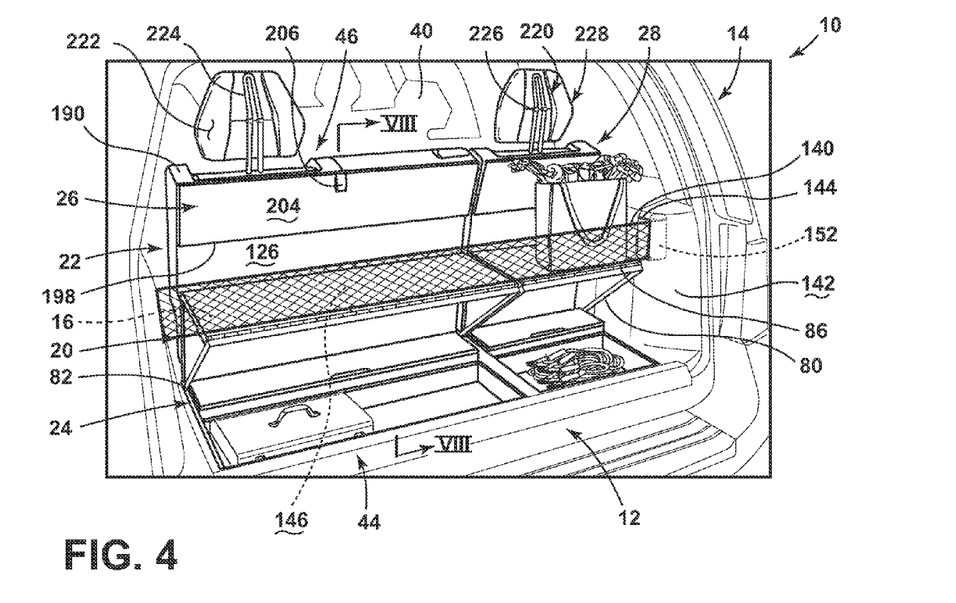
FIG. 4 is a rear top perspective view of the embodiment of FIG. 3 with an extendable netting member disposed across the rear cargo area.
Figure 8:
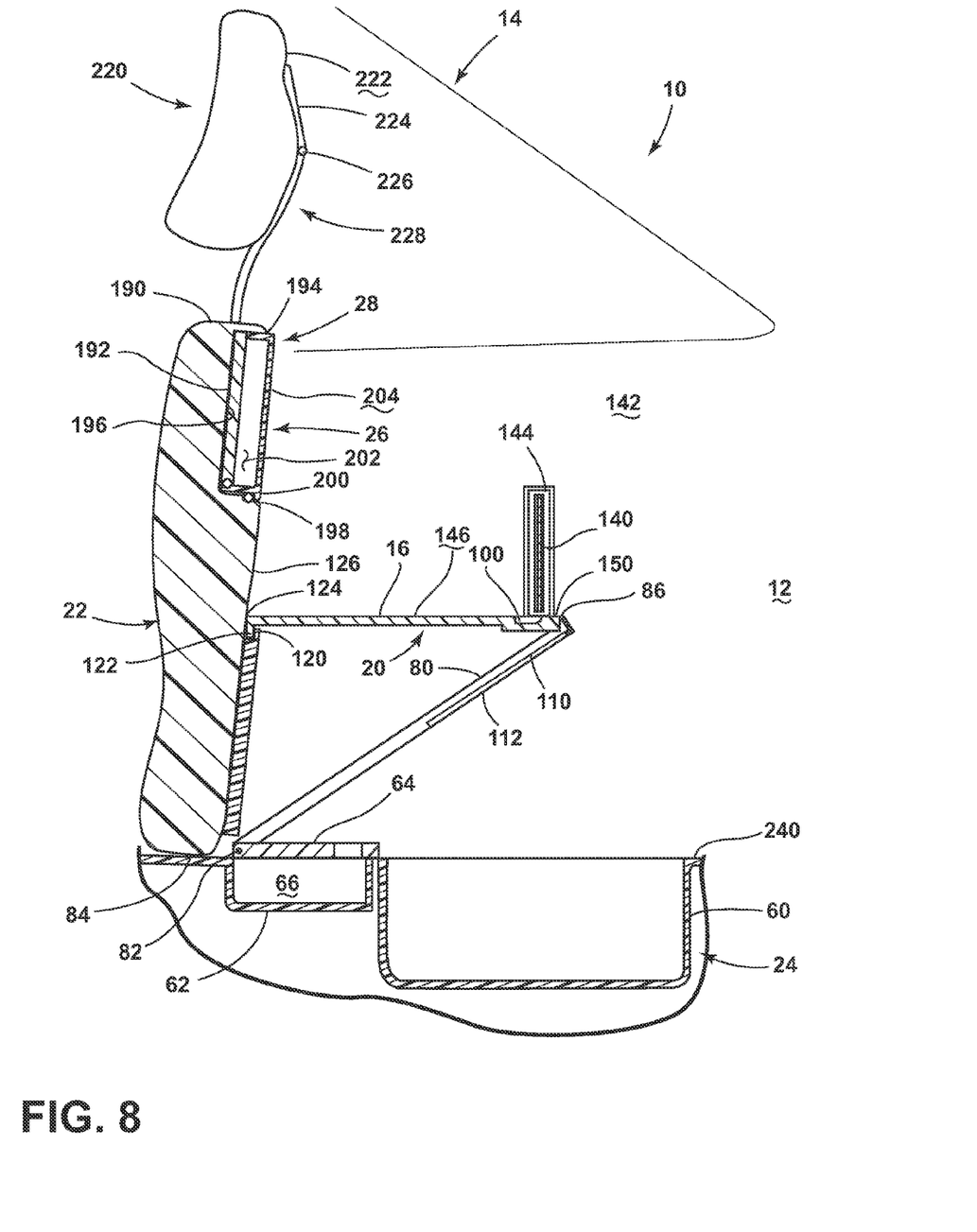
FIG. 8 is a cross-sectional view of the embodiment of FIG. 4 taken along line VIII-VIII.

Referring now to FIGS. 4 and 8, in various embodiments, an extendable boundary 140 can be disposed within an interior sidewall 142 of the vehicle 14, wherein the extendable boundary 140 can be pulled through an aperture 144 in the interior sidewall 142 of the vehicle 14 and extended across the rear cargo area 12 of the vehicle 14, wherein the extendable boundary 140 aligns proximate the platform hinge 86 between the medial platform 16 and the medial platform frame 80, when the medial platform 16 is disposed in the upper position 20. In this manner, items that are placed upon the upper surface 146 of the medial platform 16 in the upper position 20 can be substantially secured within the outer edge 148 of the medial platform 16, through the placement of the extendable boundary 140 across a front edge 150 of the medial platform 16. It is contemplated that the extendable boundary 140 can be a netting member that can be extended and retracted through the aperture 144 in the interior sidewall 142, wherein the netting is wound around a rotationally biased spool 152, such that the biasing force of the spool 152 can automatically retract the netting when not in use. The netting can include hook features at the end of the netting that can engage a netting receptacle on the opposite side of the rear cargo area 12. The aperture 144 can include an operable panel 154 that is configured to conceal the aperture 144 and the extendable boundary 140 when not in use.

In various embodiments, the extendable boundary 140 can also be a folding member attached proximate the front edge 150 of the medial platform 16 that can fold up and be secured in a substantially upright position, in order to provide a boundary that secures items upon the upper surface 146 of the medial platform 16 when the medial platform 16 is in the upper position 20.

Figure 10:
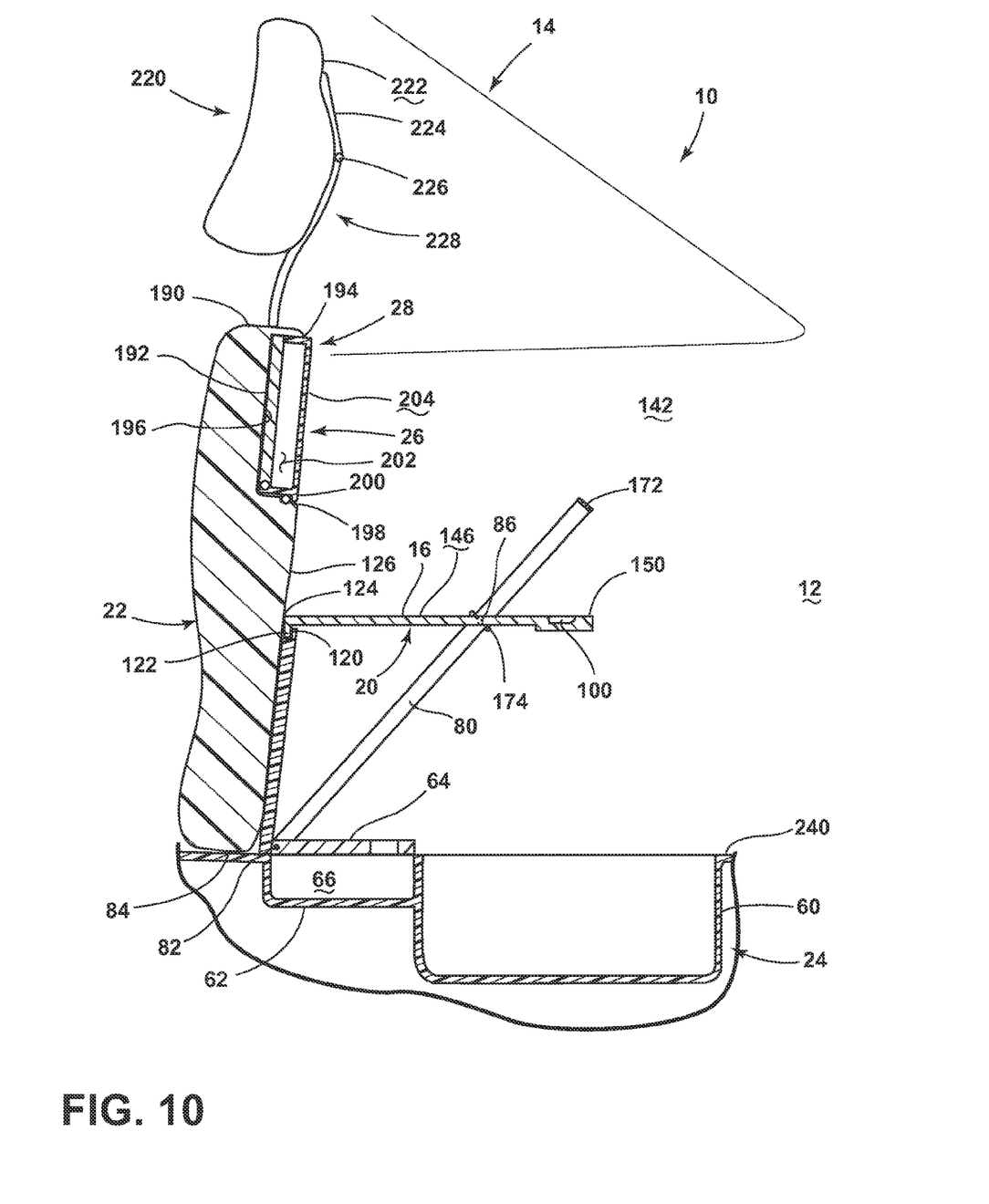
FIG. 10 is a cross-sectional view of an alternate embodiment of the multi-tiered cargo storage system with the medial platform in an upper position.

Referring now to FIG. 10, in various embodiments, the medial platform 16 can be attached to the medial platform frame 80, along the outer edges of the medial platform 16 at a platform hinge 86 made up of two pivot points, such that the medial platform 16 can be disposed horizontally in both the lower position 18 on the front container 60 and in the upper position 20 with the medial platform tab 122 engaged with the latch 120 of the rear seat 22. The placement of the platform hinge 86 is distal from the front and back edges 150, 124 of the medial platform 16. In this manner, as the medial platform 16 is moved to the upper position 20, a front member 172 of the medial platform frame 80 extends above the front edge 150 of the medial platform 16. Accordingly, the front member 172 of the medial platform frame 80 provides a boundary for the medial platform 16 in the upper position 20. In this configuration, an extendable boundary 140 may not be necessary in order to secure items upon the upper surface 146 of the medial platform 16 in the upper position 20. Also, in various embodiments, retention features 174 may be necessary to additionally secure the medial platform 16 in the upper position 20, such that articles placed on the front edge 150 of the medial platform 16 do not cause the medial platform 16 to rotate out of the upper position 20. These additional retention features 174 can be part of the connection between the latch 120 of the rear seat 22 and the medial platform tab 122, or can also be disposed at a connection between the medial platform 16 and the medial platform frame 80. These retention features 174 can also be placed at other places around the medial platform 16 in order to secure the medial platform 16 in the upper position 20.

Figure 5:
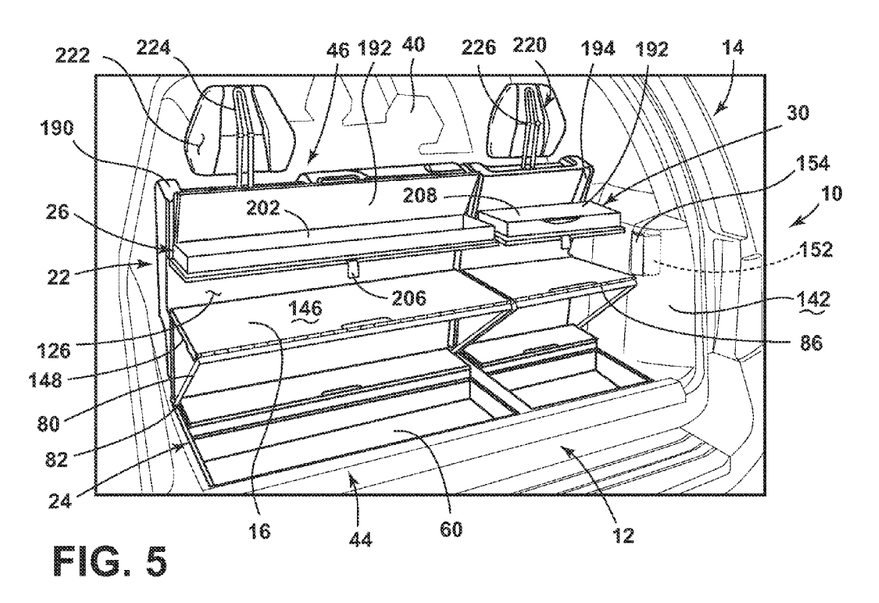
FIG. 5 is a rear top perspective view of the embodiment of FIG. 3 with the upper bins disposed in an accessible position.
Figure 6:
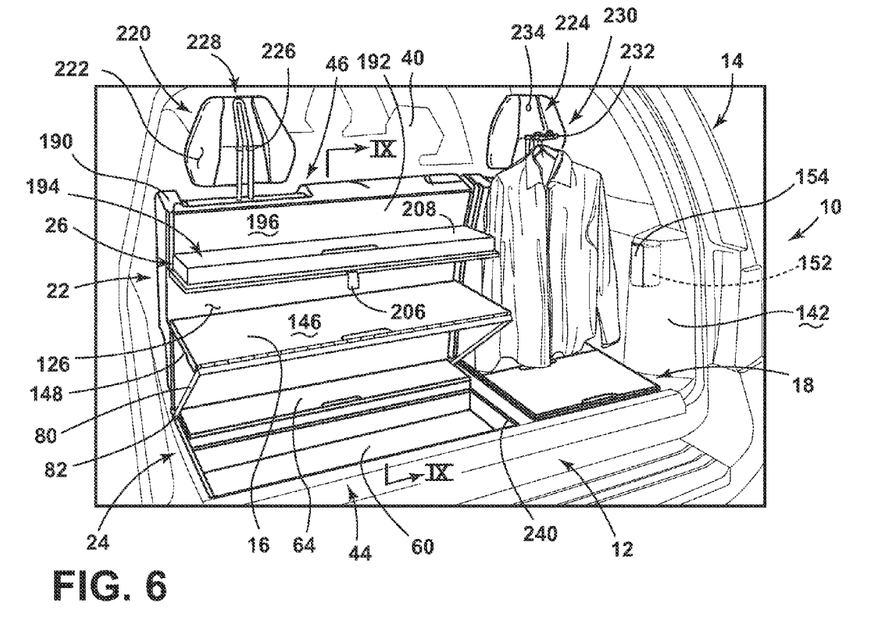
FIG. 6 is a rear top perspective view of the embodiment of FIG. 5 with one medial platform in the lowered position and one upper bin disposed in a stowed position.

Referring again to the embodiments shown in FIGS. 5 and 6, the upper bin 26 of the multi-tier storage system 10 is disposed proximate a top portion 190 of the rear seat 22. The upper bin 26 includes an upper bin lid 192 that is operable between open and closed positions when the upper bin 26 is rotated downward to the accessible position 30. Additionally, the top portion 190 of the rear seat 22 includes an opening 194 that defines a recess 196 that is configured to receive the upper bin 26 when the upper bin 26 is rotated upward to the stowed position 28. In this configuration, the upper bin 26 is hingedly coupled to the rear seat 22 proximate a lower edge 198 of the opening 194. At the connection between the rear seat 22 and the upper bin 26, one or more securing features 200 are disposed within either the rear seat 22, the upper bin 26, or both to substantially prevent the rotation of the upper bin 26 lower than the accessible position 30, being substantially horizontal. These securing features 200 can include, but are not limited to, tabs within the hinges, a notch or protrusion in the upper bin 26, or cooperative features between the upper bin 26 and the rear seat 22 proximate the recess 196, among other similar securing features 200. The upper bin 26 includes an upper bin inner volume 202 that is configured to hold various items in both the stowed and the accessible positions 28, 30. In various embodiments, when in the stowed position 28, a bottom surface 204 of the upper bin 26 is substantially flush with the rear surface 126 of the rear seat 22 proximate the upper bin 26. The upper bin 26 can include an upper bin handle 206 or other similar grasping feature that is configured to allow the user to move the upper bin 26 between the stowed and accessible positions 28, 30. In various embodiments, the upper bin lid 192 can also operate as a third tier platform 208 upon which various items can be placed. It is contemplated that the third tier platform 208 can cooperate with a secondary extendable boundary 140 that can extend across the rear cargo area 12 from one side of the rear cargo area 12 to the other, or include an operable member of the upper bin 26, in order to provide a boundary to substantially secure items upon the third tier platform 208 of the upper bin 26.

Figure 9:
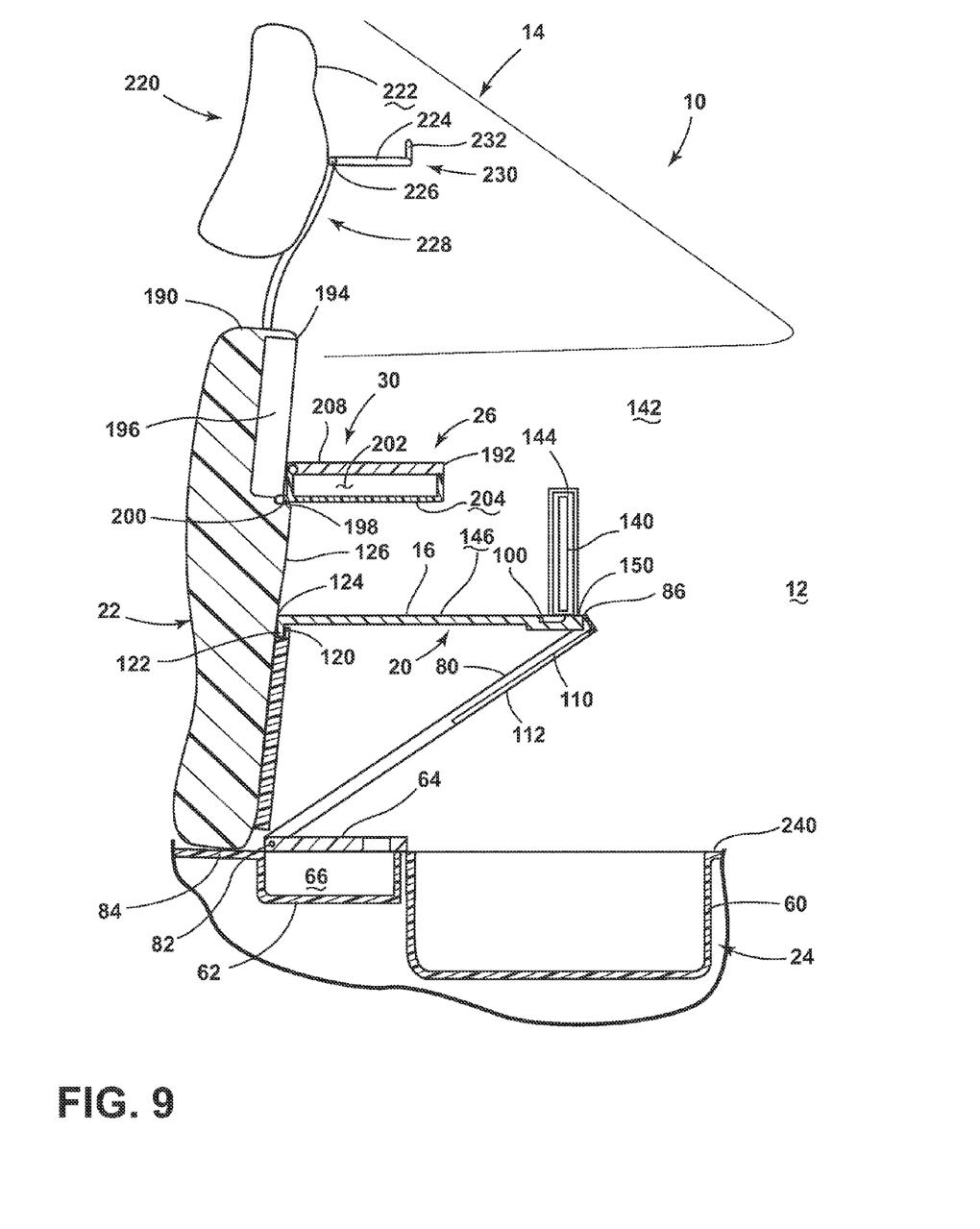
FIG. 9 is a cross-sectional view of the embodiment of FIG. 6 taken along line IX-IX.

In the embodiments illustrated in FIGS. 6 and 9, the rear seat 22 of the vehicle 14 can include one or more headrests 220 that extend from the top portion 190 of the rear seat 22 and are vertically operable to accommodate varying heights of users. A back surface 222 of the headrest 220 can include an operable hook 224 that can be rotated at a hook hinge 226 between a vertical position 228 and a horizontal position 230. In this manner, hanging items such as hangers, bags, luggage and other hanging-type materials can be placed upon the operable hook 224 in the horizontal position 230 to secure such items within the rear cargo area 12. The operable hook 224 can include a hanger tab 232 at the end of the operable hook 224 to prevent items hanging upon the operable hook 224 from slipping off the end of the operable hook 224 during operation of the vehicle 14. The headrest 220 can include a tab recess 234 that is configured to receive the hanger tab 232 when the operable hook 224 is in the vertical position 228, wherein the hanger tab 232 can cooperate with the tab recess 234 to provide an interference fit between the operable hook 224 and the back surface 222 of the headrest 220 to substantially secure the operable hook 224 in the vertical position 228. It is contemplated that after items have been placed upon the operable hook 224, the operable hook 224 can be disposed in the vertical position 228 in order to substantially secure items hung thereon between the operable hook 224 and the back surface 222 of the headrest 220 to prevent such items from falling off of the operable hook 224. It is further contemplated that in various embodiments, the operable hook 224 can rotate laterally rather than vertically to provide hanging space behind the headrest 220. Additionally, in various embodiments, two or more operable hooks 224 can be disposed on the back surface 222 of each headrest 220 to provide additional hanging space for items disposed within the rear cargo area 12 of the vehicle 14.

Referring again to the embodiments shown in FIGS. 1-6, it is contemplated that where the rear seat 22 is divided into two or more seating sections 46, the multi-tier storage system 10 will be similarly divided into storage sections 44 to match the configuration of the seating sections 46. The storage section 44 of the multi-tier storage system 10 behind each of the seating sections 46 can be individually operated to provide a wide range of storage configurations. By way of explanation, and not limitation, a portion of the multi-tier storage system 10 behind one seating section 46 can be fully closed in order to provide storage space for larger items or to utilize the operable hook 224 behind one of the headrests 220. Other storage sections 44 of the multi-tier storage system 10 behind separate corresponding seating sections 46 can be positioned in alternate configurations to provide one or more tiers of shelving, typically up to three tiers, in various embodiments, to place smaller items upon each tier or within the various surfaces, compartments and bins of each storage section 44 of the multi-tier storage system 10. It is contemplated that the multi-tier storage system 10 can include more than three tiers of shelving in various embodiments.

In various embodiments, the multi-tier storage system 10 can be made of a variety of materials that can include, but are not limited to, wood, metal, plastics, composite materials, combinations thereof, as well as other substantially sturdy materials that can be used for storage purposes within a vehicle 14.

Also, in various embodiments, where the multi-tier storage system 10 is disposed proximate a rear seat 22 that can be moved forward and rearward and where the rear seat 22 can be reclined and raised to various positions, the multi-tier storage system 10 can be configured to adapt to such movements of the rear seat 22. When the rear seat 22 is moved between a forward and rearward position, the frame pivot points 82 between the platform hinge 86 and the bottom bin can be configured to move laterally with the movement of the rear seat 22. In such a configuration, when the medial platform 16 is disposed in the upper position 20, the medial platform 16 can move with the rear seat 22 without being moved out of the horizontal configuration. When the medial platform 16 is moved to the lower position 18, the medial platform frame 80 can extend and retract to allow the medial platform 16 to engage the front container 60 of the bottom bin 24 to provide a cover for the front container 60 as the rear seat 22 is moved laterally. Alternatively, the medial platform 16 can extend within the medial platform frame 80 to properly fit upon the front container 60 of the bottom bin when the medial platform 16 is in the lower position 18. When the rear seat 22 is moved backward or forward when the medial platform 16 is in the lower position 18, the extension features of the medial platform frame 80 and/or the medial platform 16 can account for this movement without having the medial platform 16 disengage from the lip 240 of the front container 60 of the bottom bin 24.

Similarly, in various embodiments, where the rear seat 22 can tilt between reclined and upright positions, the features of the multi-tier storage system 10 can also adapt to account for this rotational movement of the rear seat 22. As the rear seat 22 is moved between the reclined and upright positions, the various features disposed within the rear seat 22 that include, but are not limited to, latches 120 for receiving the medial platform 16 in the upper position 20, upper bins 26, and operable hook 224, can be automatically adjusted through mechanical alignment features disposed within the rear seat 22. These mechanical features of rear seat 22 can operate to maintain a substantially horizontal configuration of the medial platform 16, the upper bin 26, and the operable hook 224 as the rear seat 22 is rotated between the reclined and upright positions. The adjusting movements of the multi-tier storage system 10 to account for the movements of the rear seat 22 are individually operable within separate divided seating sections 46 and the corresponding storage sections 44 of the multi-tier storage system 10 that are divided according to divisions within the rear seat 22.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A multi-tier vehicular storage system comprising:
   a medial platform operable between lower and upper positions;
   a rear seat configured to horizontally receive the medial platform in the upper position;
   a bottom bin disposed below and behind the rear seat and at least partially covered by the medial platform in the lower position; and
   an upper bin coupled with the rear seat and rotationally operable between stowed and accessible positions.

2. The storage system of claim 1, wherein the bottom bin includes a front container and a rear container having a lid, and wherein the front container is covered by the medial platform in the lower position.

3. The storage system of claim 1, further comprising:
   a medial platform frame hingedly coupled to at least one edge of the medial platform and extending to the bottom bin, wherein the medial platform frame rotates about the bottom bin to operate the medial platform between the upper and lower positions, and wherein the medial platform is substantially horizontal in the upper and lower positions.

4. The storage system of claim 3, further comprising:
   a retractable net operable between a retracted position proximate a sidewall of a vehicle, and an extended position across a rear storage area of the vehicle, wherein the retractable net is configured to define a medial tier boundary proximate the at least one edge of the medial platform in the upper position.

5. The storage system of claim 1, wherein the rear seat includes at least two operable seat sections, and wherein each operable seat section includes a corresponding medial platform, bottom bin and upper bin.

6. The storage system of claim 5, wherein the rear seat includes three operable seat sections.

7. The storage system of claim 1, wherein the upper bin includes an operable lid, and wherein the rear seat includes a top portion defining a recess that receives the upper bin in the stowed position, and wherein the upper bin is hingedly coupled to the rear seat proximate a lower edge of the recess.

8. The storage system of claim 1, wherein the rear seat includes a headrest having a rear surface, and wherein a hook operable between open and closed positions is coupled to the headrest proximate the rear surface.

9. A vehicular rear-compartment storage system comprising:
   an operable frame having a platform;
   a rear seat having a retainer for horizontally receiving the platform when the frame is in an upper position;
   a bottom bin having an upper lip configured to receive the platform when the frame is in a lower position; and
   an upper bin attached to the rear seat and rotatable between stowed and accessible positions.

10. The storage system of claim 9, wherein the bottom bin includes a front container and a rear container having a lid, and wherein the front container is covered by the platform when the frame is in the lower position.

11. The storage system of claim 9, wherein the frame is hingedly coupled to at least one edge of the platform and extends to the bottom bin, and wherein the frame rotates about the bottom bin between the upper and lower positions, and wherein the platform is substantially horizontal when the frame is in the upper and lower positions.

12. The storage system of claim 11, further comprising:
    a retractable net operable between a retracted position proximate a sidewall of a vehicle, and an extended position across a rear storage area of the vehicle, wherein the retractable net in the extended position is configured to define a platform boundary proximate the at least one edge of the platform disposed in the upper position.

13. The storage system of claim 9, wherein the rear seat includes at least two operable seat sections, and wherein each operable seat section includes a corresponding platform, bottom bin and upper bin.

14. The storage system of claim 9, wherein the upper bin includes an operable lid, and wherein the rear seat includes a top portion defining a recess that receives the upper bin in the stowed position, and wherein the upper bin is hingedly coupled to the rear seat proximate a lower edge of the recess.

15. The storage system of claim 9, wherein the rear seat includes a headrest having a rear surface, and wherein a hook operable between open and closed positions is coupled to the headrest proximate the rear surface.

16. The storage system of claim 13, wherein the rear seat includes three distinct seating sections.

17. A multi-tier vehicular storage system comprising:
    a bottom bin;
    a medial platform having an operable frame attached to the bottom bin, wherein the medial platform at least partially encloses the bottom bin when the frame is in a lower position;
    a rear seat configured to horizontally receive the medial platform when the frame is in the upper position; and
    a stowable upper bin operable between stowed and accessible positions.

18. The storage system of claim 17, wherein the operable frame is hingedly coupled to at least one edge of the medial platform and extends to the bottom bin, and wherein the operable frame rotates about the bottom bin between the upper and lower positions, and wherein the medial platform is substantially horizontal when the frame is in the upper position and the lower position.

19. The storage system of claim 18, further comprising a retractable net operable between a retracted position proximate a sidewall of a vehicle, and an extended position across a rear storage area of the vehicle, wherein the retractable net in the extended position is configured to define a platform boundary proximate the at least one edge of the medial platform disposed in the upper position.

20. The storage system of claim 17, wherein the rear seat includes at least two operable seat sections, and wherein each operable seat section includes a corresponding medial platform, bottom bin and stowable upper bin.

* * * * *